United States Patent
Yang

(10) Patent No.: US 6,563,713 B2
(45) Date of Patent: May 13, 2003

(54) POWER SUPPLY UNIT FOR A PORTABLE GAME MACHINE

(76) Inventor: Fu-I Yang, 5th Floor, 101, Hsin Pu 8th Street, Tao-Yuan City (TW)

( * ) Notice: Subject to any disclaimer, the term of this patent is extended or adjusted under 35 U.S.C. 154(b) by 0 days.

(21) Appl. No.: 09/910,781

(22) Filed: Jul. 24, 2001

(65) Prior Publication Data

US 2003/0021094 A1 Jan. 30, 2003

(51) Int. Cl.[7] .............................. H05K 7/02; H02J 7/00; H02J 9/00
(52) U.S. Cl. ........................ 361/752; 320/112; 307/150
(58) Field of Search ................................ 361/752, 728, 361/730, 736; 307/150, 151; 320/111–115

(56) References Cited

U.S. PATENT DOCUMENTS

| | | | | |
|---|---|---|---|---|
| 5,689,179 A | * | 11/1997 | Walker | 323/283 |
| 5,729,448 A | * | 3/1998 | Haynie et al. | 363/97 |
| 5,736,833 A | * | 4/1998 | Farris | 320/21 |
| 6,121,753 A | * | 9/2000 | Walker et al. | 320/132 |
| 6,329,786 B1 | * | 12/2001 | Ono | 320/113 |
| 2002/0024327 A1 | * | 2/2002 | Testin | |

OTHER PUBLICATIONS

Texas Instruments Publication TL 431,431A Adjustable Precision Shunt Regulators Specification vol. SLVS005M, Jul. 1978, Fig 24.*

* cited by examiner

Primary Examiner—David Martin
Assistant Examiner—Dameon E Levi
(74) Attorney, Agent, or Firm—Rosenberg, Klein & Lee

(57) ABSTRACT

The present invention relates to a power supply unit for a portable game machine which is engaged in a cover of a battery chamber of the portable game machine. The power supply unit includes a DC socket and a circuit board with constant voltage loop. The circuit board is connected with the DC socket, a positive and a negative conductors and arranged in a chamber of the cover. The positive conductor has a compression spring and a conductive bar while the negative conductor is inverted U-shaped. The circuit board comprises a diode, a voltage-stabilizing integrated circuit, an n-p-n power transistor and three resistances so that a constant voltage loop to control the DC voltage output is created. Accordingly, the required power of the present invention can be supplied by the supply network through the commercially available transformer or by automobiles through the cigarette lighter outlet. Besides, the positive and negative conductors have the advantages of convenient assembly and excellent contact.

1 Claim, 9 Drawing Sheets

POWER SUPPLY UNIT FOR A PORTABLE GAME MACHINE

BACKGROUND OF THE INVENTION

1. Field of the Invention

The present invention relates to a power supply unit for a portable game machine, and more particularly, to a universal power supply unit for the game machine model of Nintendo Game Boy Advance.

2. Description of the Prior Art

The Nintendo Game Boy machine is portable due to its small volume so that the Nintendo video games are widely popular. The current model of the game machine 1 (Game Boy Advance), as shown in FIGS. 1 and 2, has a battery chamber 11 at the bottom thereof in which two dry batteries 12 are received for supplying 3V DC voltage to the game machine. Besides, a cover 13 is engaged in the battery chamber 11.

The power of the game machine 1 is much consumed so that two dry batteries 12 can only be used for few hours. After the batteries have run down, they have to be replaced, thereby causing a considerable cost. In order to resolve this problem, a power transforming unit 2, as shown in FIG. 3, is installed in the battery chamber 11 in addition to the design of power supply by batteries. The power transformer 2 includes a transformer connector 21 which transforms the main power to 3V DC voltage which passes through a cover 22 engaged in the battery chamber 11, utilizing the electric contact between the positive and negative output poles 221 at the side of the cover and the positive and negative poles 111 inside of the battery chamber 11 for supplying the required power to the portable game machine 1.

However, the cover 22 and the transformer connector 21 of the power transformer 2 have special specification. In other words, the DC jack 222 on the cover 22 is only suitable for the connecting terminal 211 of the transformer connector 21 manufactured by Nintendo. Besides, the output of the transformer connector 21 is preset at 3V DC voltage. Thus, the inside of the cover 22 only has a filtering inductance L1 and a diode D1. Therefore, the cover 22 doesn't fit other power supply units, for example, the DC 12V power supplied from the cigarette lighter in automobiles. Moreover, there are no mains sockets in automobiles for the transformer connector 21. Thus, much inconvenience in use is still existing.

SUMMARY OF THE INVENTION

It is a primary object of the present invention to provide a power supply unit for a portable game machine which is engaged in a cover of a battery chamber and contains a constant voltage loop. Besides, the power supply unit can be used in combination with commercially available transformers so that the convenience in use is much improved.

It is another object of the present invention to provide a power supply unit for a portable game machine in which the circuit devices have advantages of convenient assembly, stable structure and excellent electric contact.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
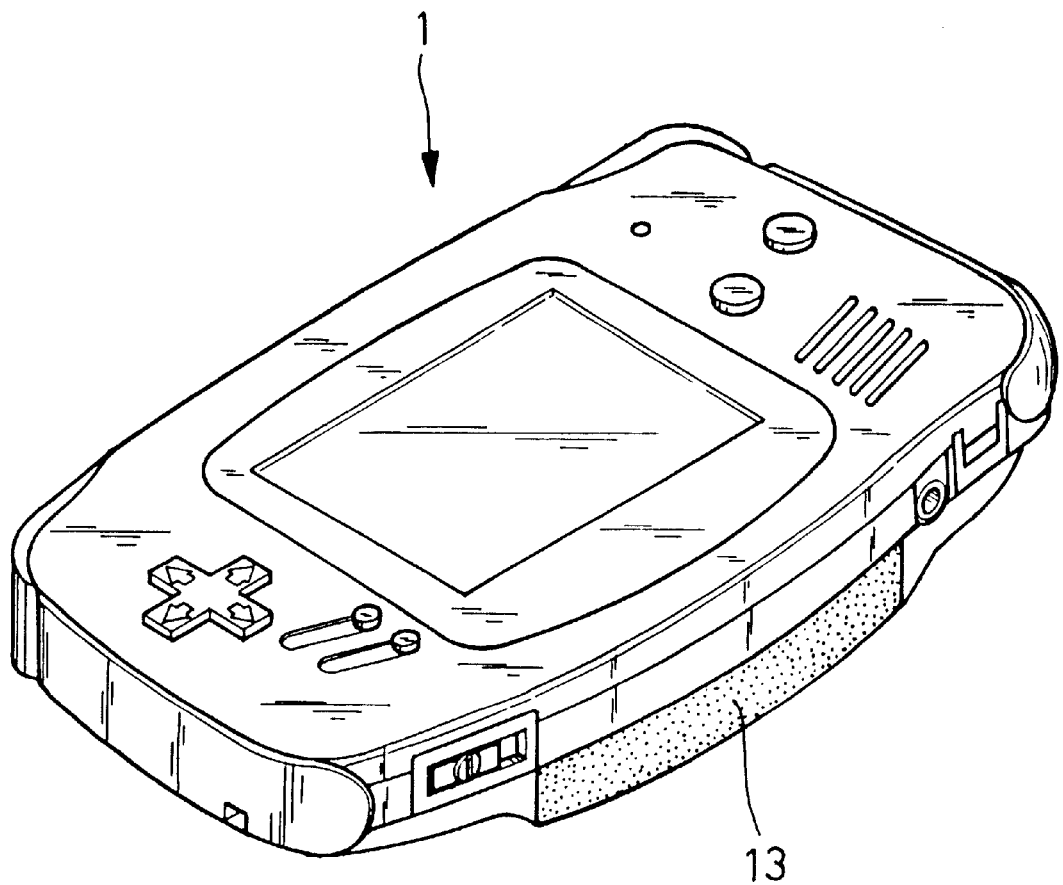
FIG. 1 is a perspective view of a conventional Nintendo game machine.
Figure 2:
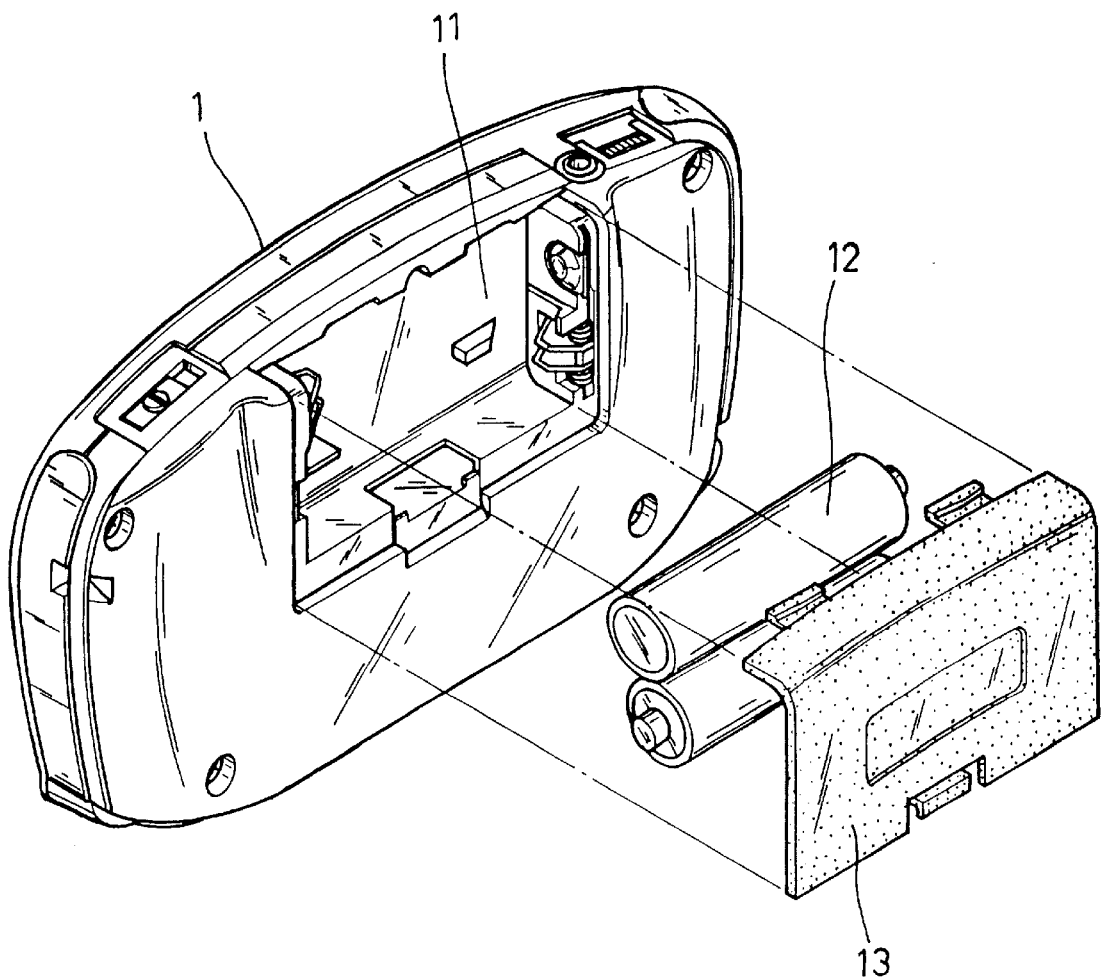
FIG. 2 is a perspective exploded view of the conventional Nintendo game machine.
Figure 3:
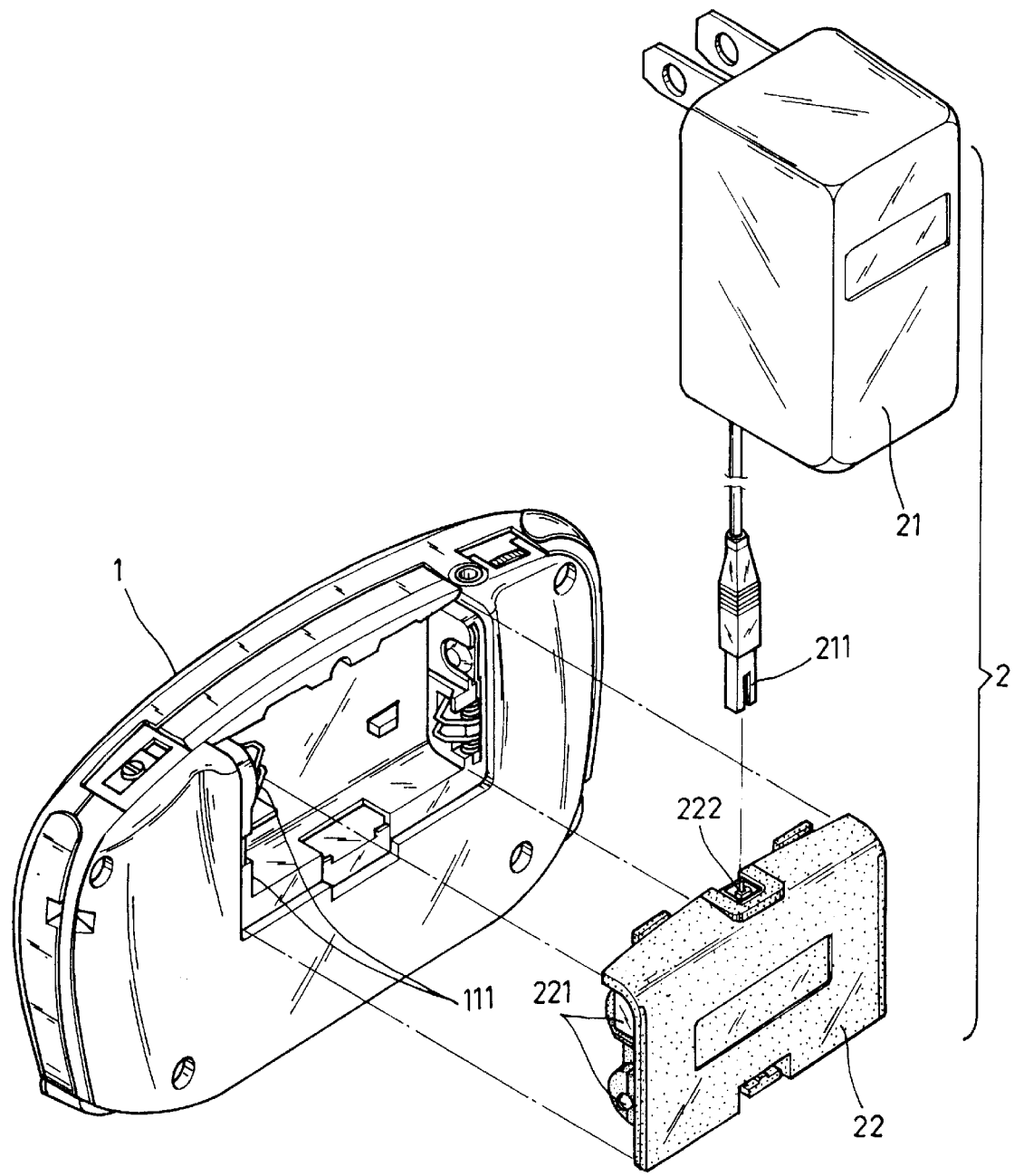
FIG. 3 is a perspective exploded view of the conventional Nintendo game machine with an adapter.
Figure 4:
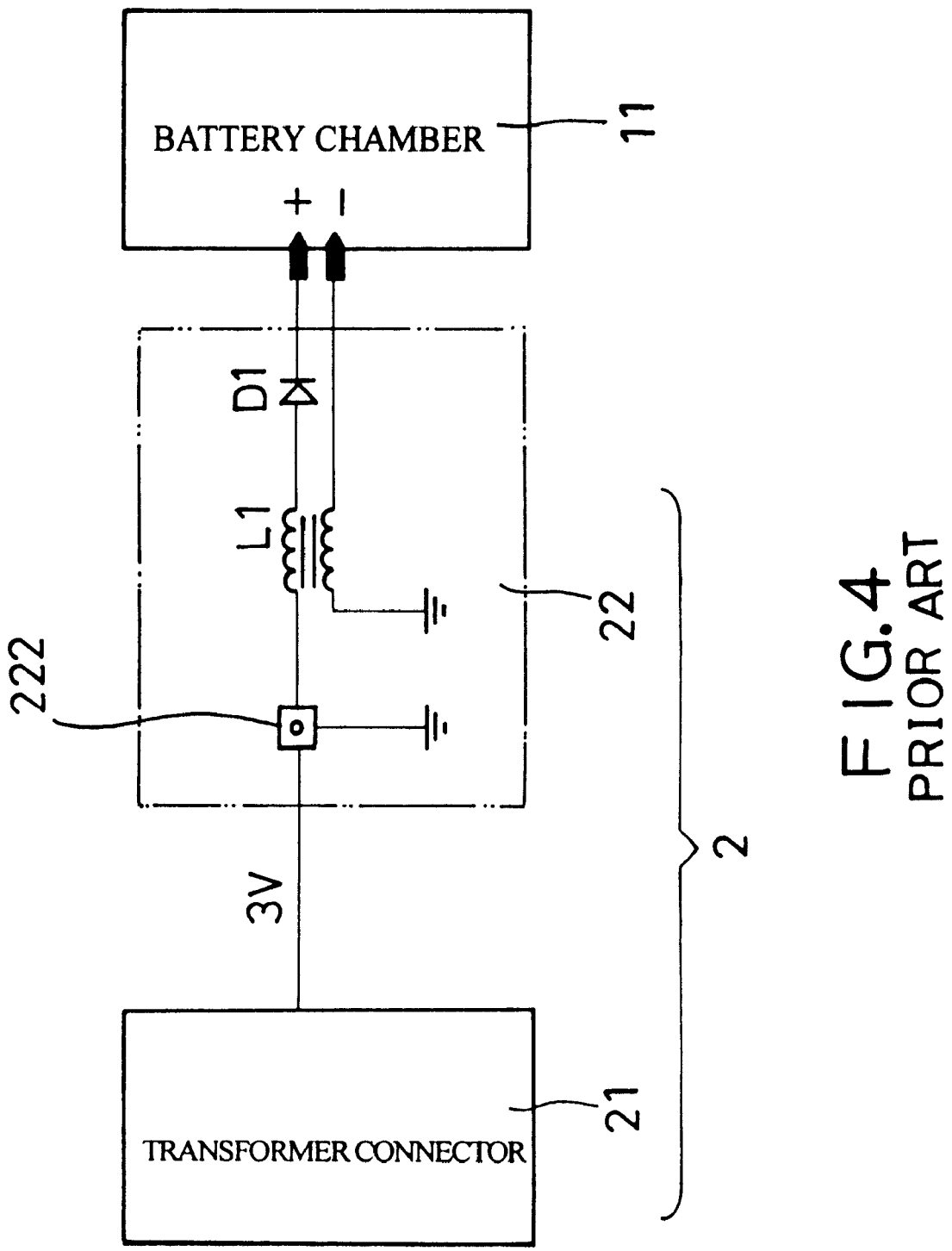
FIG. 4 is a circuit diagram of the adapter of the conventional Nintendo game machine.
Figure 5:
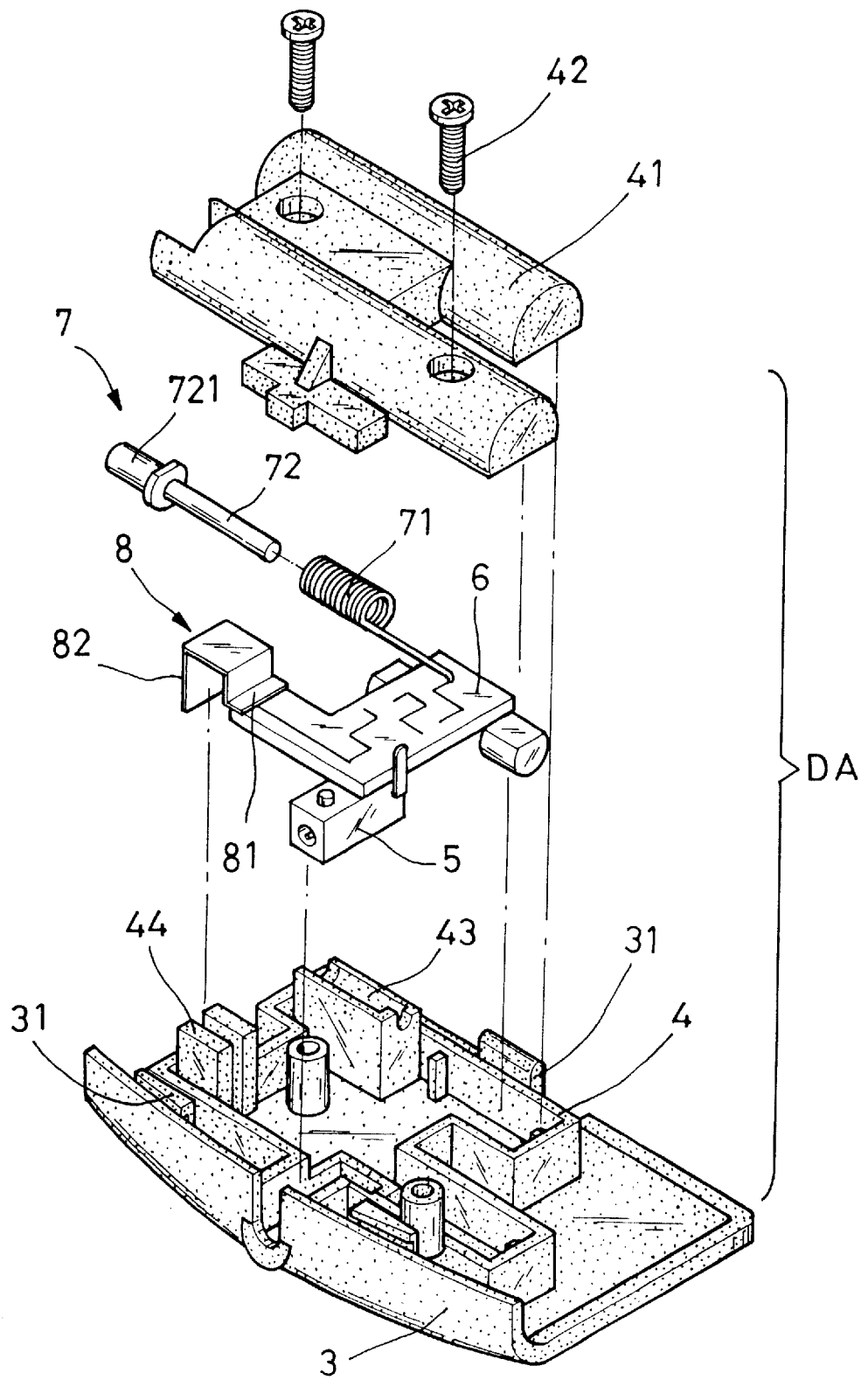
FIG. 5 is a perspective exploded view of the power supply unit of the present invention.
Figure 6:
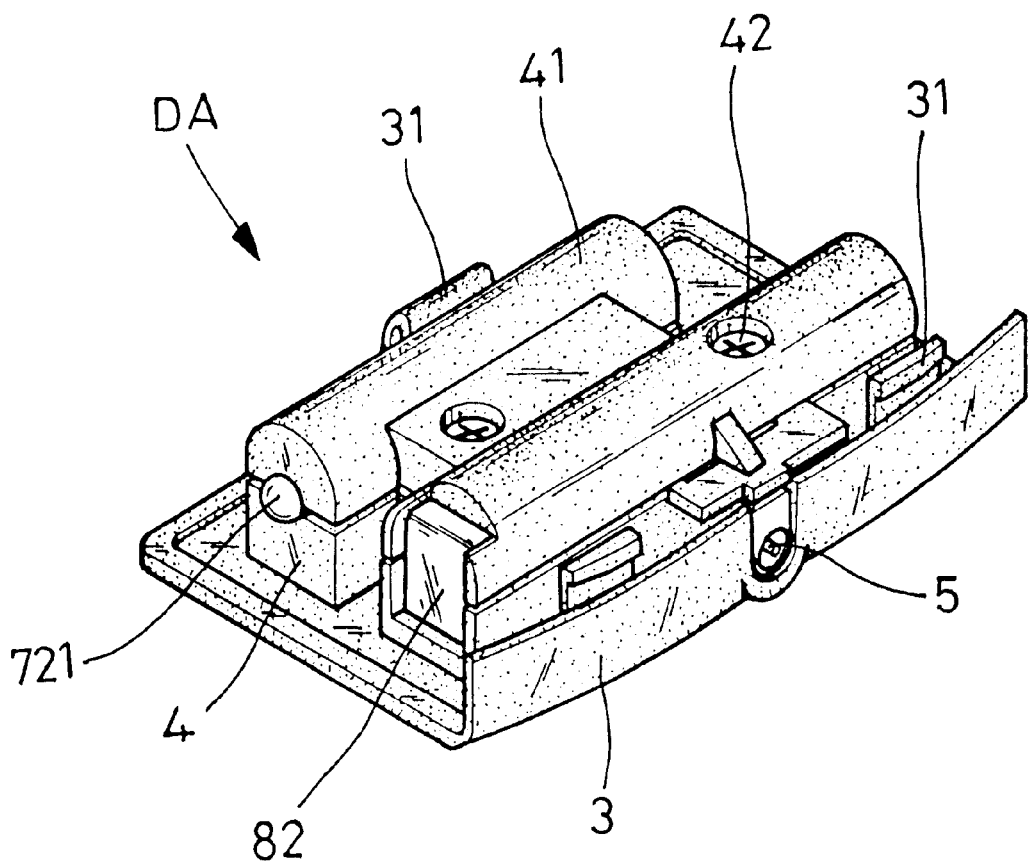
FIG. 6 is a perspective assembly view of the power supply unit of the present invention.
Figure 7:
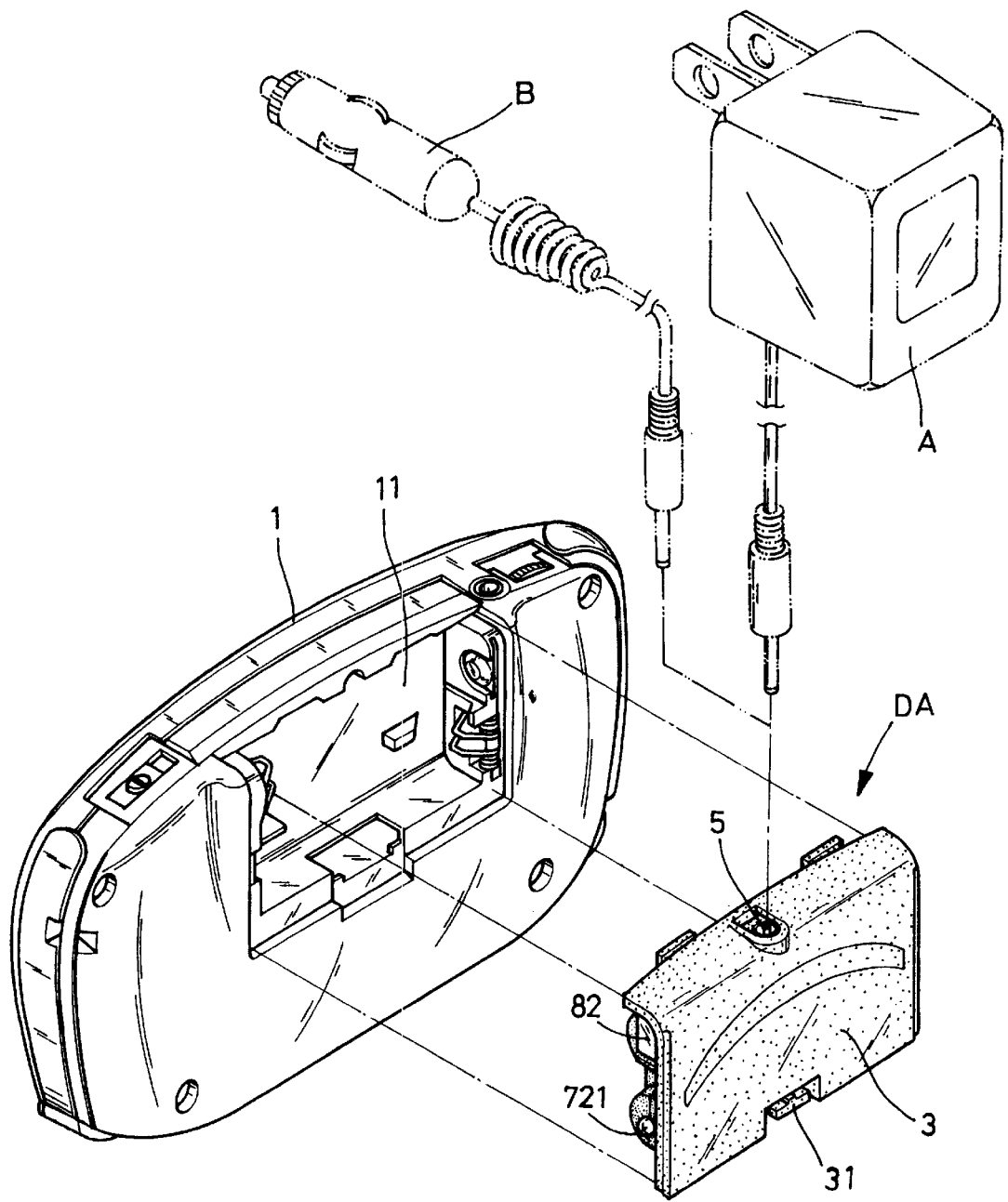
FIG. 7 is a schematic drawing of the power supply unit of the present invention that is applied to a portable game machine.

First of all, referring to FIGS. 5 through 7, the power supply unit for a portable game machine disclosed by the present invention includes a cover 3 and a chamber 4.

The cover 3 is insertable in a battery chamber 11 of a portable game machine 1, and has a locking piece 31 at the front and rear ends thereof, respectively.

The chamber 4 on the cover 3 receives a DC socket 5, a circuit board 6, a positive conductor 7 and a negative conductor 8 on three of which an elongated cap 41 is fixed by a screw 42.

The DC socket 5 is connected with the circuit board 6 which is provided with a constant voltage loop. The positive conductor 7 includes a compression spring 71 and a conductive bar 72. The front end of the compression spring 71 is fixed on the circuit board 6 while the conductive bar 72 is inserted into the coil. The conductive bar 72 is formed with a pole contact 721 of larger diameter at the front end thereof while the positive conductor 7 extends across a slide groove 43 of the chamber 4 for linear extension and contraction. The pole contact 721 projects from one side of the chamber 4.

The negative conductor 8 being inverted U-shaped comprises at the inner side thereof a horizontal flap 81 which is welded on the circuit board 6. The inverted U-shaped negative conductor 8 is inserted between two upright pieces while a vertical contact surface 82 at the outermost side of the negative conductor 8 is exposed to the outside.

Figure 8:
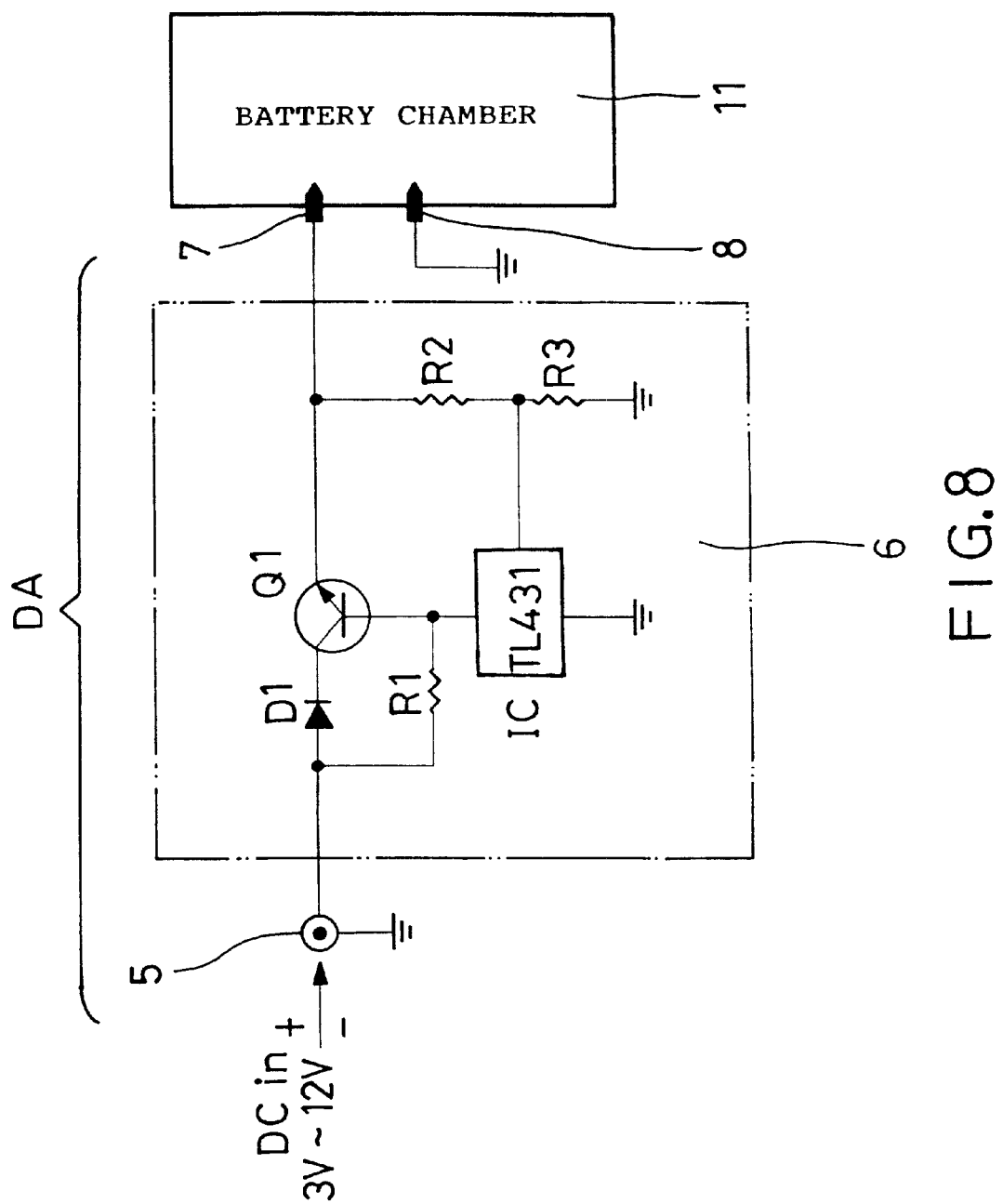
FIG. 8 is an internal circuit diagram of the power supply unit of the present invention.

As shown in FIG. 8, the circuit board 6 is provided with a constant voltage loop and comprises a diode D1, a voltage-stabilizing integrated circuit, an n-p-n power transistor Q1 and three resistances R1, R2. R3. The DC voltage of 3V~12V enters through the diode D1 into the DC socket 5. A base electrode of the power transistor Q1 is connected with the voltage-stabilizing integrated circuit marked by the model No. of TL431. A collector and an emitter of the power transistor Q1 are connected between the diode D1 and the positive conductor 7. The current-limiting resistance R1 is provided between the collector and the base electrode. The other resistances R2, R3 are provided between the power transistor Q1 and the voltage-stabilizing integrated circuit. Accordingly, the constant voltage loop to control the DC voltage output is created.

Figure 9:
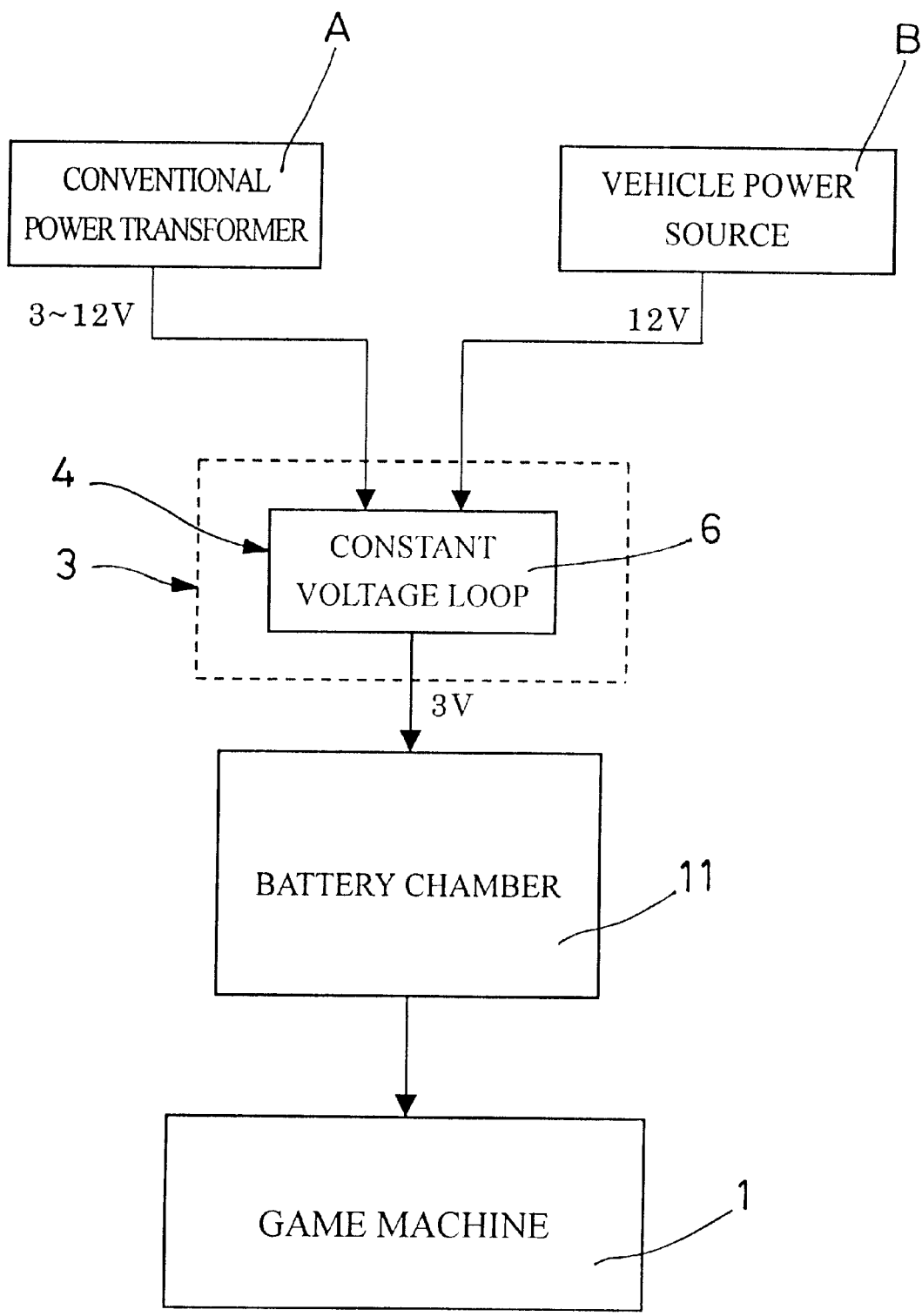
FIG. 9 is a block diagram showing the operating sequence of the present invention.

Referring to FIGS. 8 and 9, the commercially available transformers with 3~12V output are applicable due to the constant voltage loop inside of the cover 3 of the present invention. The constant voltage loop adjusts the input voltage (3~12V) from the DC socket 5 to 3V which is constantly supplied to the portable game machine 1. The power supply B of 12V from the cigarette lighter outlet in automobile is also applicable to the portable game machine 1. Thus, the using convenience of the present invention is much improved.

Furthermore, the constant voltage loop is disposed on the circuit board 6, and artfully combined with the DC socket 5 and the positive and negative conductors 7, 8. Accordingly, it's not only convenient for assembly. Especially, the positive and negative conductors 7, 8 are very stable after assembly so that the electric contact with the battery chamber 11 is excellent and the power failure is avoided.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claim.

What is claimed is:

1. A power supply unit for a portable game machine comprising:
    a cover insertable in a battery chamber of a portable game machine, said cover having an enclosed chamber formed therein;
    a DC socket extending into said chamber of said cover and having a positive terminal and a negative terminal; and,
    a constant voltage circuit mounted on a circuit board, said constant voltage circuit having an input coupled to said DC socket and an output respectively coupled to a positive conductor and a negative conductor, said constant voltage circuit including
        a diode having an anode electrically coupled to said positive terminal of said DC socket and to a first terminal of a first resistor,
        a power transistor having a collector terminal electrically coupled to a cathode of said diode and an emitter terminal electrically coupled to said positive conductor,
        a voltage-stabilizing integrated circuit having a first terminal electrically coupled to a base terminal of said power transistor and to a second terminal of said first resistor, and a second terminal electrically coupled to said negative terminal of said DC socket, and
        a second resistor coupled in series with a third resistor, said series second and third resistor being coupled between said positive conductor and said negative conductor, said negative conductor being electrically coupled to said negative terminal of said DC socket and having an inverted U-shaped contour, said negative terminal having a flap formed on one end thereof affixed to said circuit board and an opposing end defining a contact surface exposed external to said chamber of said cover, said voltage-stabilizing integrated circuit having a third terminal coupled to a node between said second and third resistors, said first, second and third resistors having respective predetermined values for adjusting said voltage-stabilizing integrated circuit to provide a voltage of 3 volts DC between said positive and negative conductors responsive to a voltage ranging between 3 and 12 volts DC applied to said DC socket, said positive conductor being biased and formed by a coil spring having a first end coupled to said circuit board and a conductive bar having one end inserted into a second end of said coil spring, an opposing end of said conductive bar having a pole contact formed thereon of a diameter larger than a diameter of the other end, a portion of said positive conductor being disposed in a slide groove formed in said cover with said pole contact projecting from a side of said cover and being linearly displaceable against a bias force of said coil spring.

* * * * *